(12) United States Patent
Niikkonen et al.

(10) Patent No.: US 7,904,757 B2
(45) Date of Patent: Mar. 8, 2011

(54) ACTIVITY IDENTIFIER BASED TRACING AND TROUBLESHOOTING

(75) Inventors: Ari Pekka Niikkonen, Redmond, WA (US); Darene Brice Lewis, Bothell, WA (US); Anthony Goodrich Jones, Kirkland, WA (US); Gueorgui Bonov Chkodrov, Redmond, WA (US); Tin Qian, Bellevue, WA (US); Shuangtong Feng, Kirkland, WA (US); Jwalin Buch, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 348 days.

(21) Appl. No.: 12/134,181

(22) Filed: Jun. 5, 2008

(65) Prior Publication Data

US 2009/0307533 A1 Dec. 10, 2009

(51) Int. Cl.
  *G06F 11/00* (2006.01)
(52) U.S. Cl. .............................. 714/39; 714/18; 714/20
(58) Field of Classification Search ........................ None
  See application file for complete search history.

(56) References Cited

U.S. PATENT DOCUMENTS

| | | | |
|---|---|---|---|
| 6,493,837 B1 | 12/2002 | Pang et al. | |
| 6,718,535 B1 | 4/2004 | Underwood | |
| 6,748,431 B1 | 6/2004 | Fleig et al. | |
| 6,748,555 B1* | 6/2004 | Teegan et al. | 714/38 |
| 7,171,464 B1 | 1/2007 | Raghuraman et al. | |
| 7,240,244 B2* | 7/2007 | Teegan et al. | 714/38 |
| 7,243,271 B2* | 7/2007 | Teegan et al. | 714/47 |
| 7,269,758 B2* | 9/2007 | Kadashevich | 714/38 |
| 7,281,052 B2 | 10/2007 | Block et al. | |
| 2004/0117768 A1* | 6/2004 | Chang et al. | 717/125 |
| 2005/0060403 A1 | 3/2005 | Bernstein et al. | |
| 2005/0144026 A1* | 6/2005 | Bennett et al. | 705/1 |
| 2005/0171807 A1* | 8/2005 | Klein et al. | 705/1 |
| 2006/0074714 A1* | 4/2006 | Aziz et al. | 705/2 |
| 2006/0174346 A1* | 8/2006 | Carroll et al. | 726/26 |
| 2006/0233114 A1 | 10/2006 | Alam et al. | |
| 2007/0168993 A1 | 7/2007 | Gopal et al. | |
| 2007/0220360 A1* | 9/2007 | Weinert et al. | 714/45 |
| 2008/0184058 A1* | 7/2008 | McDermott et al. | 714/2 |
| 2008/0216098 A1* | 9/2008 | Agarwal et al. | 719/328 |
| 2009/0038001 A1* | 2/2009 | Bozak et al. | 726/14 |
| 2010/0070806 A1* | 3/2010 | Wolf et al. | 714/47 |

OTHER PUBLICATIONS

"New Networking Features in Windows Server 2008 and Windows Vista", Feb. 15, 2006, Microsoft Technet, Microsoft Corporation,pp. 35.
Hanselman et al., "End to End Tracing", Pwop Productions Inc., Feb. 21, 2007, pp. 5.
"Activity", Microsoft Corporation, 2007, pp. 4.
Park et al, "Improve Debugging and Performance Tuning With ETW", MSDN Magazine, Apr. 2007, Microsoft Corporation, pp. 10.

* cited by examiner

*Primary Examiner*—Christopher S McCarthy (57) ABSTRACT

To trace an activity through multiple components or applications that may be involved in the performance of the activity, an activity identifier can be generated and utilized by the various components or applications. Each can generate its own activity identifier to minimize changes to existing interfaces. When logging of events has been activated, each application or component can provide, to an event store, an indication of the activity identifier it is using for a given activity. If a preceding or subsequent component utilizes a different activity identifier for aspects of the same activity, a link between the two activity identifiers can be communicated to the event store. Subsequently, examination of the event store can filter out irrelevant entries based on the activity identifiers. A graph linking the various related activity identifiers can be created and only those events associated with activity identifiers not in the graph can be filtered out.

15 Claims, 4 Drawing Sheets

ACTIVITY IDENTIFIER BASED TRACING AND TROUBLESHOOTING

BACKGROUND

Computer-executable instructions can fail to provide an expected result due either to an improper programming of the computer-executable instructions, or due to a hardware or other error that is beyond the scope of the computer-executable instructions. Traditionally, the authors of computer-executable instructions have sought to minimize the former. To those ends, modern operating systems and software applications for computing devices often provide mechanisms by which errors occurring during their execution can be diagnosed. Such mechanisms traditionally include the provision of information to a capable party, such as a programmer of the operating system or software application. Using the information provided, an analysis of individual sections of computer-executable instructions can be undertaken in an effort to determine the cause of the error.

As operating systems and other software applications increase in both complexity and in interoperability, diagnosing the source of an error, or deviation from an expected result, can become significantly more complicated. In particular, an error experienced by one software application, or a component thereof, may be the result of operations performed by another application or component. Efforts to collect a sufficient amount of information associated with the error can become burdensome, for both the user of the software application and for those investigating the error, if multiple components or applications are potentially involved. For example, a single software component may provide useful functionality or services to multiple other components and applications. Such a component may comprise, or be associated with, a myriad of data of which only a small percentage may be relevant to an error experienced by another component that was using the services provided by the former.

SUMMARY

In modern operating systems and applications, a single "activity" can entail the utilization of, and the provision of data from, multiple components. In one embodiment, the actions of those multiple components, and the data utilized by those multiple components, associated with a single, particular activity can be linked through an "activity identifier." Subsequent analysis, then, can reference the activity identifier to isolate those actions and data that are associated with the activity of interest, and can, thereby, filter out unrelated information.

In another embodiment, the utilization of an activity identifier can be provisioned with a minimum of modification to existing interfaces between components by enabling the components to generate their own activity identifiers based on information that is already being passed to or from that component, or which is otherwise available to that component. In such a manner, existing interfaces need not be extended to provide for the passing of a universal activity identifier between two or more components.

In a further embodiment, a log file can be generated that comprises specific indications of the association between two or more activity identifiers identifying the same activity. In particular, when a component generates its own activity identifier for a given activity, that component, or another component that can obtain the generated activity identifier, can provide, to the log file, an explicit relationship between the generated activity identifier and another activity identifier identifying the same activity.

In a still further embodiment, to avoid requiring global uniqueness of activity identifiers, a log file can comprise explicit indicators of the beginning and ending of the use of a given activity identifier to identify a particular activity. In such a manner, components can generate activity identifiers though mechanisms that may not be able to guarantee uniqueness. Additionally, components can reuse activity identifiers, distinguishing their use for different activities via these explicit indicators.

In a yet further embodiment, post-processing of the log file can identify related activity identifiers and can filer out irrelevant information, retaining only information associated with the activity identifiers associated with an activity of interest. To identify related activity identifiers, the post-processing can utilize explicit associations between activity identifiers and explicit indications of the beginning and end of the utilization of a particular activity identifier. The post-processing can further identify related activity identifiers through extrapolation based on other available data, such as unique source or destination addresses associated with the activity, other identifiers assigned to data associated with the activity, or the presence or absence of particular activity identifiers in relevant sections of the log file.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which

DETAILED DESCRIPTION

The following description relates to the generation and utilization of an "activity identifier" that can be utilized by multiple components or applications that are utilized in the performance of a single "activity". Each component or application can, if appropriate, derive a new activity identifier from information that is available to that component and that is associated with the activity, thereby avoiding modifications to the interfaces between those components to provide for the passing of an activity identifier. Subsequent determination of which activity identifiers identify the same activity, can be informed by explicit relationships between activity identifiers used by multiple components or applications that can be provided to a log file. Additionally, the log file can comprise explicit beginning and ending indicators, thereby enabling an activity identifier to be reused to identify different activities. Post-processing of the log file can filter out information that is not relevant to a particular activity by referencing explicit relationships between activity identifiers and explicit beginning and endings of those activity identifiers, and also by referencing other available information from which relationships and beginnings and endings can be inferred or otherwise deduced.

Strictly for illustrative purposes, and not by way of limitation, the mechanisms described herein focus on, and are presented in the context of, a network-related "activity" that can utilize multiple network-communication-related components and applications. However, the mechanisms described below are not so limited, as the same mechanisms are equally useful and applicable to any collection of related components, applications or other collections of discrete elements of computer-executable instructions. Consequently, the network-centric aspects of the descriptions below are illustrative only and the overall descriptions are meant to encompass any collection of one or more discrete elements of computer-executable instructions that are associated though the performance of one or more actions that can be conceptualized as a single "activity".

Similarly, for ease of description and conceptualization of the mechanisms described herein, reference is made to a "log file" that can comprise the information indicated below as being provided to such a log file. However, the mechanisms described below are not limited to the use of a singular conventional "file" data structure, and the term "log file" as used herein is intended to reference any collection of data, however embodied, that can accept, retain and provide the information described below as being provided to, and requested from, such a log file. For example, the mechanisms described are equally capable of utilizing one or more repositories of information within application programs, registry databases, or other constructs, or even one or more repositories of information that remain un-persisted in memory, as the indicated "log file."

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Figure 1:
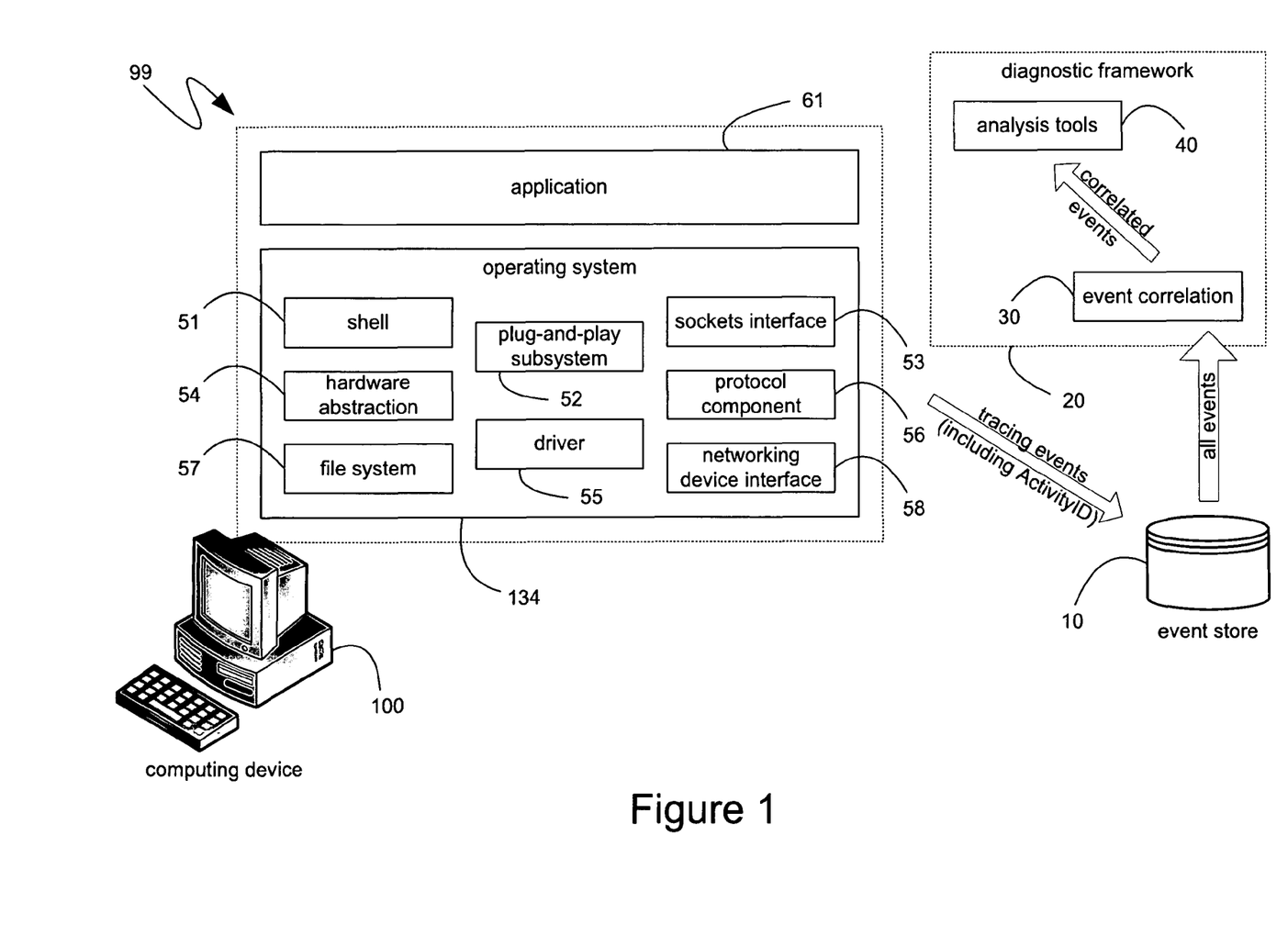
FIG. 1 is a block diagram of an exemplary system utilizing activity identifiers.

Turning to FIG. 1, an exemplary system 99 is illustrated comprising an event store 10, a diagnostic framework 20 and a computing device 100 that is communicationally coupled to the event store 10 and the diagnostic framework 20. In one embodiment, the computing device 100 can comprise the event store 10 and the diagnostic framework 20, while in an alternative embodiment either one or both of the event store and diagnostic framework can be located apart from the computing device. The computing device 100, described in more detail below with reference to FIG. 2, can comprise one or more applications, such as application 61 and an operating system 134. The operating system 134 can, in turn, comprise multiple components that can provide support and functionality for a specific aspect of the operating system's features. For illustrative purposes, the operating system 134 is shown comprising a few selected components, such as a shell 51 that can provide support for a user interface, a plug-and play subsystem 52 that can enable the utilization of peripherals, a network sockets interface 53 that can provide network access to applications, a hardware abstraction layer 54 that can enable the operating system 134 to execute on various supported computing hardware, one or more drivers, such as driver 55, that can enable communication with peripherals, one or more protocol components, such as protocol component 56, that can provide support for network communication protocols, a file system 57 that can store data in a structured form and a networking device interface 58 that can communicate with networking hardware. Although not shown, the application 61 can likewise comprise multiple components, such as plug-ins, extensions, filters, skins and other components.

Activities by the user of the computing device 100 can result in the performance of one or more actions by multiple components, either of an application with which the user is currently interacting, such as application 61, or of the operating system 134. For example, the simple action of opening a web page with a web browsing application can result in the performance of one or more actions by: (1) the web browsing application, (2) the sockets interface 53, (3) a Transmission Control Protocol/Internet Protocol (TCP/IP) component, (4) the networking device interface 58 and possibly other components or applications. Should any one of those components or applications experience an error, the user's activity of opening the web page will not succeed. As a result, if the user's activity of opening the web page fails, each one of these components or applications may be examined to determine the source of the failure.

However, each one of the applications and components involved with the opening of a web page may similarly be interacting with multiple other applications or components. Thus, for example, the sockets interface 53 may be cooperating with an email application, the TCP/IP component may be cooperating with a software updating process, and the networking device interface 58 may be handling the communications from each of those components and applications. Consequently, examining the components involved with the attempt to open the web page can result in the examination of a myriad of information that is unrelated to the failed web page open attempt.

In one embodiment, components and applications, such as the operating system components 51-58, and the application 61, illustrated in FIG. 1, can provide, to the event store 10, logging or tracing events that can comprise activity identifiers. The activity identifiers can be subsequently utilized to identify the information from those components and applications that is relevant to a particular activity. Thus, the event store 10 can be subsequently examined by a diagnostic framework 20 by first filtering the information in the event store based on the activity identifiers. Such filtering can be performed by the event correlation component 30, which can then provide correlated and relevant events to the analysis tools 40 for analysis, in an effort to diagnose to reason that an activity is experiencing an error, or is otherwise not being performed in an expected manner.

For multiple components or applications to utilize identical identifiers for an activity, mechanisms may need to be created to enable the passing of such identifiers between the components and applications. To avoid modifying a lot of interfaces, and to avoid creating a lot of new interfaces or other mechanisms to pass identifiers between components, different identifiers can, in one embodiment, be utilized by different components to identify the same activity. In such a manner, each component, rather than having to receive, or otherwise look up, an identifier for the current activity, can, instead, create an identifier of its own, including deriving one from the information already available to the component.

Utilizing multiple identifiers for a single activity can also provide for situations where a single activity by one application or component results in multiple activities by an upstream or downstream component. For example, a single data structure provided by the application 61 for transmission across a network can be divided into multiple smaller data structures by the protocol component 56. In such a case, the transmission of each of the smaller data structures can be considered, by the protocol component, as an activity that can be assigned a unique identifier. Each of those activities, however, can be related to the single activity, as viewed by the application 61, of the transmission of the single larger data structure.

In one embodiment, to link identifiers of common activities together, explicit linking statements can be provided to the event store 10 by any component that is aware of two or more linked identifiers. Thus, for example, if the sockets interface 53 creates a new activity identifier to refer to a specific activity, and the sockets interface is aware of the activity identifier used by the application 61 to refer to the same activity, the sockets interface can provide information to the event store 10 linking the two identifiers together. Similarly, if the protocol component 56 has created an identifier for a given activity, and is aware of the identifier that will be created, or that has already been created, by the networking device interface 58, the protocol component can provide information to the event store 10 linking the two identifiers together. In such a manner, components or applications can provide linking information to the event store 10 that links identifiers used by either, or both, upstream or downstream components.

In an alternative embodiment, the event correlation component 30 can derive links between identifiers based on other entries in the event store 10. For example, the event store 10 can comprise information from the protocol component 56 regarding an identifier it is using to identify a particular activity and the event store can further comprise information from the networking device interface 58 regarding a different identifier it is using to identify another activity. An examination of the activities, as recorded in the event store 10, can reveal, for example, that each activity involved communications directed to a common address from a common initiating application, and that each utilized a common network port. In such a case, the event correlation component 30 can determine that the identifiers provided by the protocol component 56 and the networking device interface 58 are linked, despite the absence of an explicit linking statement in the event store 10.

Because identifiers for activities can be independently derived by various components and applications, such as based on information already available to those applications and components, there exists the possibility that the same identifier may be derived for two or more unrelated, or otherwise different, activities. In one embodiment, such repetition of identifiers can be accommodated by providing identifier lifetimes, such that an identifier only need be unique during its lifetime, for a given component. Explicit indications of the creation, and subsequent ending, of a particular identifier's lifetime can be provided to the event store 10. In an alternative embodiment, identifier lifetimes can be derived, such as by the event correlation component 30, based on information, such as timestamp information, that can already be present in the event store 10.

As indicated previously, either or both the event store 10 and the diagnostic framework 20 can be either co-located with the computing device 100, or they can be located remotely from the computing device. In one embodiment, the event store 10 can be co-located with the computing device 10, while the diagnostic framework 20 can be located remotely. In such an embodiment, the provision of information, including activity identifiers, to the event store 10, by applications and components executing on the computing device 100, can be either manually or automatically triggered upon the occurrence of an error or other event that the user desires to troubleshoot. For example, when the user of the computing device 100 indicates a desire to troubleshoot an activity, the user can be prompted to enable the logging of information to the event store 10 by some or all of the components and applications executing on the computing device 100. Prior to such an explicit enabling, however, the applications and components executing on the computing device 100 need not provide information to the event store 10.

Once sufficient information has been collected in the event store 10, the information can be provided to a diagnostic framework 20 which can, in one embodiment, be remote from the computing device 100, such as service provided by a software developer or a system administrator. In an alternative embodiment, such as can be used when the computing device 100 is used as a testing platform, the logging of information to the event store 10 by some or all of the components and applications executing on the computing device 100 can be enabled by default, and the diagnostic framework 20 can be co-located with the computing device 100, thereby increasing diagnostic efficiency Before proceeding with further detailed descriptions of the provision of information to the event store 10, and the analysis thereof, the framework for the below descriptions is provided with reference to FIG. 2, wherein an exemplary computing device 100, such as the one from FIG. 1, is further illustrated. The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

Figure 2:
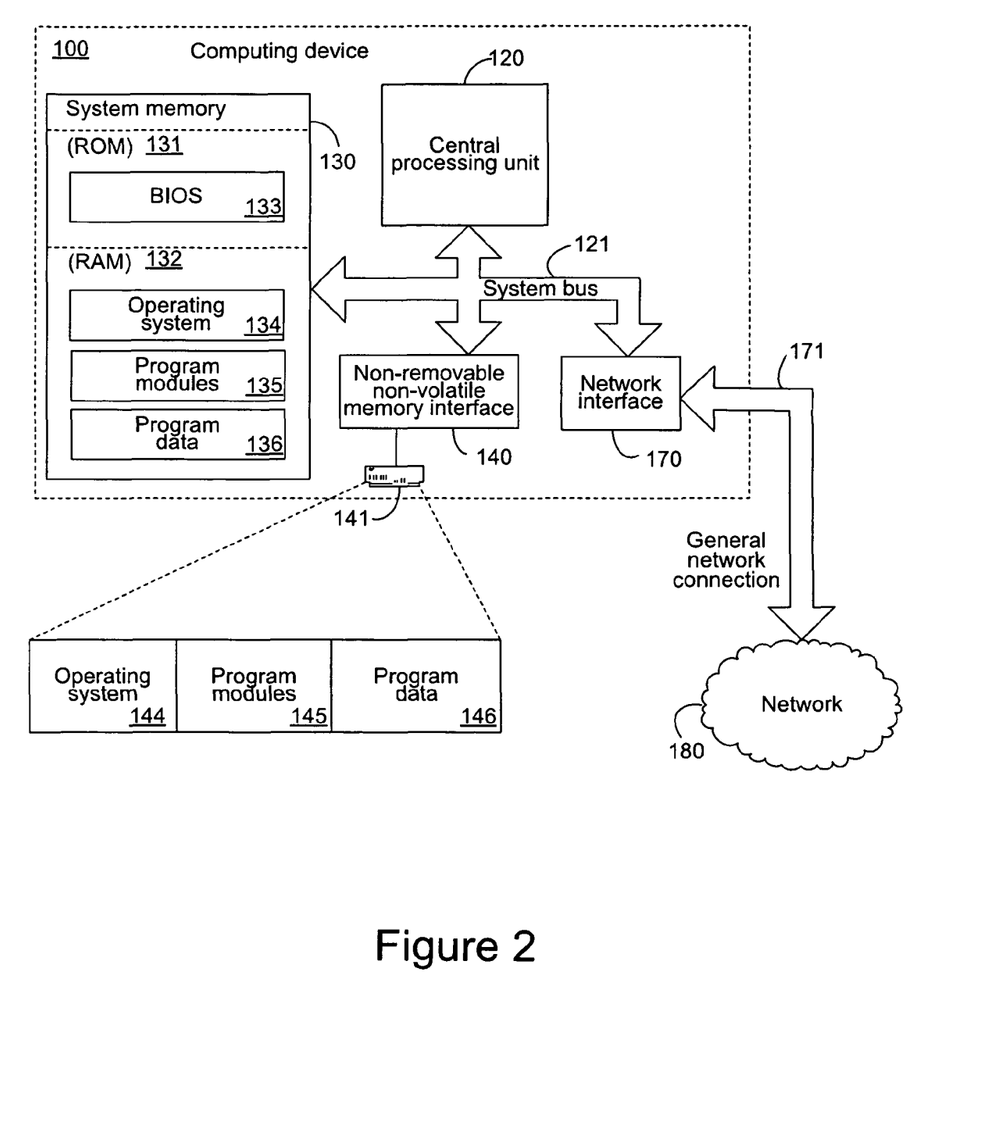
FIG. 2 is a block diagram of an exemplary computing device.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, other program modules 135, and program data 136.

The computing device 100 may also include other removable/non-removable, volatile/nonvolatile computer storage media. By way of example only, FIG. 2 illustrates a hard disk drive 141 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Additionally, the computing device 100 may operate in a networked environment using logical connections to one or more remote computers. For simplicity of illustration, the computing device 100 is shown in FIG. 2 to be connected to a network 180 that is not limited to any particular network or networking protocols. The logical connection depicted in FIG. 2 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Figure 3:
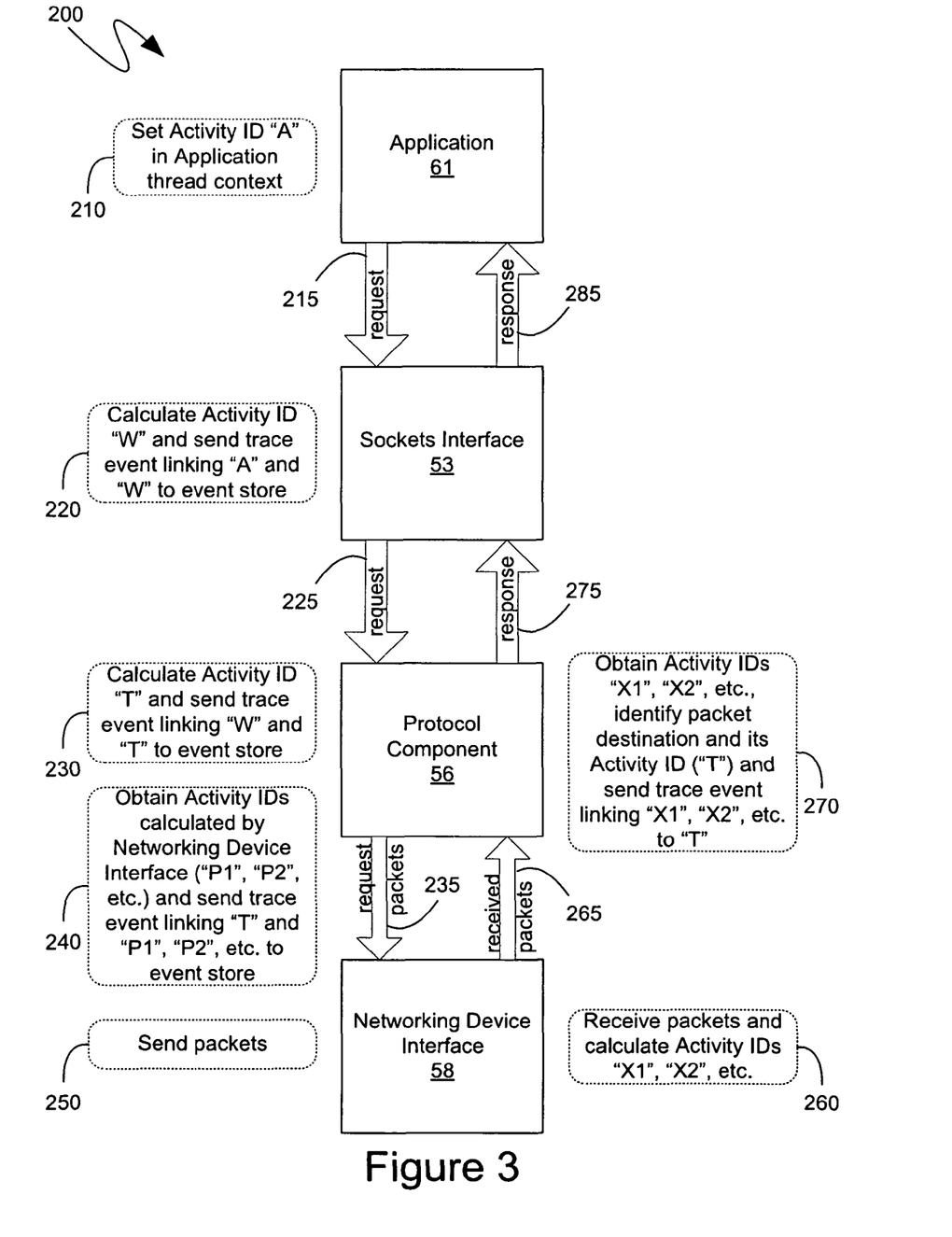
FIG. 3 is a block diagram of an exemplary series of associated components utilizing related activity identifiers for a single activity.

Turning to FIG. 3, the above descriptions of the generation and use of an activity identifier are further illustrated within the specific example of a network communication and applications and components associated with the exemplary network communication, as shown in block diagram 200. Specifically, block diagram 200 illustrates the application 61 sending and receiving network communications through three components of the operating system 134, namely the sockets interface 53, the protocol component 56, and the networking device interface 58. Other operating systems may have a greater or fewer number of components associated with networking communications, such as of the sort illustrated in FIG. 3, than the exemplary operating system 134 and the below descriptions are extendable to such other collections of components and applications.

For illustrative purposes, the application 61 can be considered, in the following descriptions, to be a network communication application, such as a ubiquitous web browser. Initially, the web browsing application 61 can be instructed, such as by the user or otherwise, to perform an activity, such as, for example, the opening of a web page. The web browsing application 61 can then make an appropriate request 215 for the web page, which can, in the illustrated embodiment, be provided to the sockets interface 53. The web browsing application 61 can also set an identifier for the activity of opening the requested web page, as illustrated by step 210. In one embodiment, the activity identifier, nominated "A" for ease of reference, can be retained, by the web browsing application 61 in its thread context. Additionally, if the logging of events to the event store 10 has been activated, such as described above, the web browsing application 61 can provide an indication of the assigning of the activity identifier "A" to the web page opening activity to the event store 10. Traditionally, the activation of the logging of events would have caused the web browsing application 61 to provide information to the event store 10 comprising the nature of the request 215 and the address to which it was directed. In one embodiment, the web browsing application 61, in addition to providing the information it would traditionally have provided to the event store 10, can further provide an explicit indication of the beginning of the lifetime of the activity identifier "A" and an indication that the activity identifier "A" is associated with the request 215.

Upon receiving the request 215, the sockets interface 53 can calculate its own identifier for the activity of opening the web page which, from the perspective of the sockets interface, comprises providing the request 215 to the protocol component 56 as request 225. Because the sockets interface 53 can calculate its own identifier, the interface by which the web browsing application 61 communicates with the sockets interface 53 need not be modified to provide for the provision of the web browsing application's identifier "A". In one embodiment, the sockets interface 53 can calculate its own identifier, nominated "W" for ease of reference, from information that is already available to the sockets interface. For example, the sockets interface 53 can calculate the identifier "W" based on the specific socket used for the request 215, or other unique information about, or associated with, the request. As illustrated by step 220, in addition to calculating the activity identifier "W", the sockets interface 53 can provide an explicit linking statement to the event store 10 linking the identifier "W" to the identifier "A" that was used by the web browsing application 61 to identify the same activity. The sockets interface 53 can obtain, or otherwise learn of, the identifier "A" by examining the web browsing application's thread context in manner well known to those skilled in the art. The sockets interface 53 can further provide, to the event store 10, an explicit indication of the beginning of the lifetime of the activity identifier "W". Additionally, as with the web browsing application 61, the sockets interface 53 can also provide, to the event store 10, the information it would have traditionally provided when the logging of events on the computing device 100 was active.

Upon receiving request 225 from the sockets interface 53, the protocol component 56, which can, in the instant example, be a TCP/IP component, can create its own activity identifier for the activity of opening the web page. From the perspective of the protocol component 56, the activity of opening the web page comprises packetizing the request 225 and providing it, in the form of request packets 235, to the networking device interface 58. As illustrated by step 230, the protocol component 56 can calculate an identifier, nominated "T" for ease of reference, and can provide a linking indication to the event store 10, linking the identifier "T" with the identifier "W" used by the sockets interface for the same activity of opening the web page. As with the sockets interface 53, the protocol component 56 can calculate the activity identifier based on information already available to it. For example, the protocol component 56 can calculate the identifier "T" based on the endpoint identifier of the request 225, or other unique data provided with, or associated with, the request 225.

In one embodiment, the interface provided by the protocol component 56 can be modified to accept the specification of an activity identifier, thereby enabling the protocol component 56 to learn of the identifier "W" utilized by the sockets interface 53. The protocol component can, thereby, obtain both identifiers "W" and "T" to provide the linking between them to the event store 10. In addition, the protocol component 56 can provide an indication to the event store 10 of the beginning of the lifetime of the activity identifier "T" as used by the protocol component to identify the activity of opening the web page. The protocol component 56 can also provide any other relevant information to the event store 10, as it would traditionally have done if logging had been activated on the computing device 100.

In another embodiment, the protocol component 56 can, in the same manner as described above with respect to the sockets interface 53, obtain the identifier "A" by examining the web browsing application's thread context. The protocol component 56 can, therefore, also provide information to the event store 10 linking its identifier "T" either directly to the identifier "A" or indirectly, via the identifier "W". The event store 10 can contain redundant information without deviating from the below described mechanisms and, consequently, the linking information provided to the event store need not only be provided in a singular fashion by the components in the manner illustrated in FIG. 3. Thus, as shown, the protocol component 56 can perform both step 230, linking the identifiers "T" and "W", and step 220, or an analog thereof without deviating from the described embodiments.

The request packets 235 provided by the protocol component 56 to the networking device interface 58 can be transmitted to the computing device hosting the requested web page by the networking device interface at step 250. In sending the request packets 235, the networking device interface can assign an activity identifier to the sending of each individual packet. For ease of reference, identifiers "P1", "P2", and so on, can be assigned by the networking device interface 58 to the activity of opening the web page, which, from the perspective of the networking device interface, comprises the transmission of multiple request packets 235 across the network 180.

In one embodiment, the protocol component 56 can provide the request packets 235 to the networking device interface 58 by requesting that the networking device interface create one or more data structures that can store the packets 235 and information about those packets. For example, a list comprising a series of entries can be created, whereby each entry identifies one packet of the request packets 235. Such entries can likewise comprise the activity identifier, such as "P1" that is associated with the corresponding request packet. In such a case, the protocol component 56 can access the list of entries and can, itself, determine the activity identifiers "P1", "P2", and so on, that were assigned by the networking device interface 58. The protocol component 56 can, therefore, provide an explicit indication of the link between its activity identifier, "T", and the activity identifiers "P1", "P2", and so on to the event store 10, as illustrated by step 240. Such an embodiment can avoid burdening the networking device interface 58.

At step 250, the networking device interface 58 can transmit the request packets 235 to another computing device, such as via the network interface 170. In one embodiment, activity identifiers can be sent together with the request packets 235 to the other computing device. In such an embodiment, an additional linking can be made between the activity identifiers "P1", "P2" and so on and the activity identifiers that can be sent with the request packets 235. In an alternative embodiment, activity identifiers need not be transmitted to another computing device with the request packets 235. Instead, the activity identifiers can be based on the packet data, such that they can be derived from the packet data itself. For example, the activity identifiers "P1", "P2", and so on, as created by the networking device interface 58, can each be based on, or derived from, the data of the packet to which those activity identifiers correspond. Consequently, mere access to the data of the packet, together with knowledge of the mechanisms used to derive the activity identifiers, can enable another process to derive the same activity identifiers "P1", "P2", and so on from the request packets 235 without requiring the transmission of those activity identifiers together with the request packets.

Ultimately, the transmission, at step 250, of the request packets 235 by the networking device interface 58 can cause the recipient computing device to transmit a response that can be received by the computing device that sent the request packets 235. Assuming proper operation of all networking elements between the computing device 100 and the recipient computing device hosting the requested web page, the associated response packets are likely to be from the computing device hosting the requested web page. However, if a network problem is encountered, associated response packets may be from an intermediate computing device, such as a firewall or proxy computing device.

When the networking device interface 58 receives a series of packets, it may not be able to determine that those packets are associated with the request packets 235, such as, for example, being the response to the request that was contained in the request packets 235. Consequently, upon receipt of any packets, the networking device interface 58 can associate, with each received packet, another identifier, as indicated by step 260. If the received packets 265 were transmitted with activity identifiers, such received activity identifiers can be associated with the activity identifiers assigned by the networking device interface 58 at step 260. Conversely, if the received packets 265 were received without activity identifiers, the networking device interface 58, in assigning activity identifiers at step 260, can derive the activity identifiers from the data of the received packets. If standardized mechanisms are used, the activity identifiers derived at step 260 can be equivalent to those derived by, for example, the computing device that sent the data that was received as received packets 265, should such an equivalence across computing devices be desired.

As with the request packets 235, in one embodiment the received packets 265 can be stored by the networking device interface 58 in such a manner that they can be referenced via entries of a list data structure. The activity identifiers assigned at step 260, nominated "X1", "X2", and so on for ease of reference, can, likewise, be referenced via corresponding entries in the list data structure. Once the received packets, and the activity identifiers associated with their receipt by the networking device interface 58 have been stored, the networking device interface can indicate the received packets 265 to the protocol component 56. In one embodiment, such an indication can comprise the provision of the list data structure by the networking device interface 58 to the protocol component 56.

The protocol component 56, upon receiving the received packets 265 can obtain the activity identifiers "X1", "X2", and so on, that were used by the networking device interface 58 to reference the activity of receiving the packets and can link those activity identifiers to its own activity identifier, as indicated by step 270. In one embodiment, the protocol component 56 can, in a manner known to those skilled in the art, identify the received packets 265 as corresponding to the request packets 235. In such a case, the protocol component 56 can link the activity identifiers "X1", "X2", and so on to the activity identifier "T" it had previously assigned to the activity of requesting the web page by providing the request packets 235 to the networking device interface 58, since the processing of the received packets 265 is a continuation of that same activity on the part of the protocol component. As indicated previously, the protocol component can obtain the activity identifiers "X1", "X2", and so on, by referencing the entries in the list provided by the networking device interface 58 when it notified the protocol component of the received packets 265.

Once the protocol component 56 has obtained the received packets 265 from the networking device interface 58, and has linked the relevant activity identifiers together by sending an indication to the event store 10, as illustrated by step 270, the protocol component can provide the data from the received packets as a response 275 to the sockets interface 53. In addition, the protocol component 56 can, as indicated previously, continue to provide to any other relevant data that it would traditionally have to the event store 10. In one embodiment, the protocol component 56 can provide an explicit indication of the end of the lifetime of the identifier "T" to the event store 10, such as, for example, when a corresponding socket, from the sockets interface 53 is closed. In an alternative embodiment, the protocol component can refrain from sending an explicit ending of the lifetime of the activity identifier "T" until such time as the protocol component 56 may have need of the identical identifier "T" to identify a different activity.

The response 275 can already comprise sufficient information to enable the sockets interface 53 to identify it as a response to the request 215 from the application 61. Consequently, the sockets interface 53 can provide the response 275 to the application 61 as response 285. Additionally, because the sockets interface 53 can identify the response 275 as part of the same action of requesting a web page, the sockets interface need not assign it a new identifier and can, instead, utilize the previously assigned activity identifier "W". Of course, since an explicit linking between "W" and the activity identifier used by the protocol component 56, "T" was previously provided at step 230, no additional linking information need be provided to the event store 10. Similarly, once the application 61 receives the response 285, it can recognize it as the response to its request to open a web page and can, accordingly, associate it with the identifier "A" that the application had previously assigned to the task of opening the web page, but it need not again explicitly link the identifier "A" and the identifier "W", as that was already performed by step 220.

The sockets interface 53 and the application 61 can, however, continue to provide logging information to the event store 10, as they would traditionally have if logging had been activated on the computing device 100. In addition, in one embodiment, either or both of the sockets interface 53 and the application 61 can provide an explicit indication to the event store 10 that the lifetime of the activity identifiers "W" and "A", respectively, has ended after the completion of their respective activities associated with the opening of the web page. In an alternative embodiment, either or both of the sockets interface 53 and the application 61 can provide an explicit indication of the ending of the lifetime of the activity identifiers "W" and "A", respectively, at a subsequent time, such as, for example, when they might need the identifiers "W" or "A", respectively, to identify a different activity.

While the above descriptions indicated that the application 61 can store the identifier "A" within its thread context and that the other referenced components can derive identifiers from available information and, thus, do not need to persist such identifiers, in another embodiment, any of the above described components can persist the relevant identifiers in a manner analogous to that described with reference to the application 61. Such a persistence of identifiers can, for example, enable a more efficient determination of when to send explicit indications to the event store 10 that the lifetime of a particular identifier is ending.

The event store 10 can, such as in the manner described, collect a myriad of information regarding the operation of some or all of the applications and components executing on the computing device 100, including specific information regarding the identifiers assigned to various tasks by various components and applications and the relationships between those activity identifiers. In one embodiment, the information collected by the event store 10, while logging was activated on the computing device 100, can include information collected during the occurrence of an error. The information thus collected by the event store 10 can then be used to attempt to identify the root cause of the error and attempt to correct it.

Figure 4:
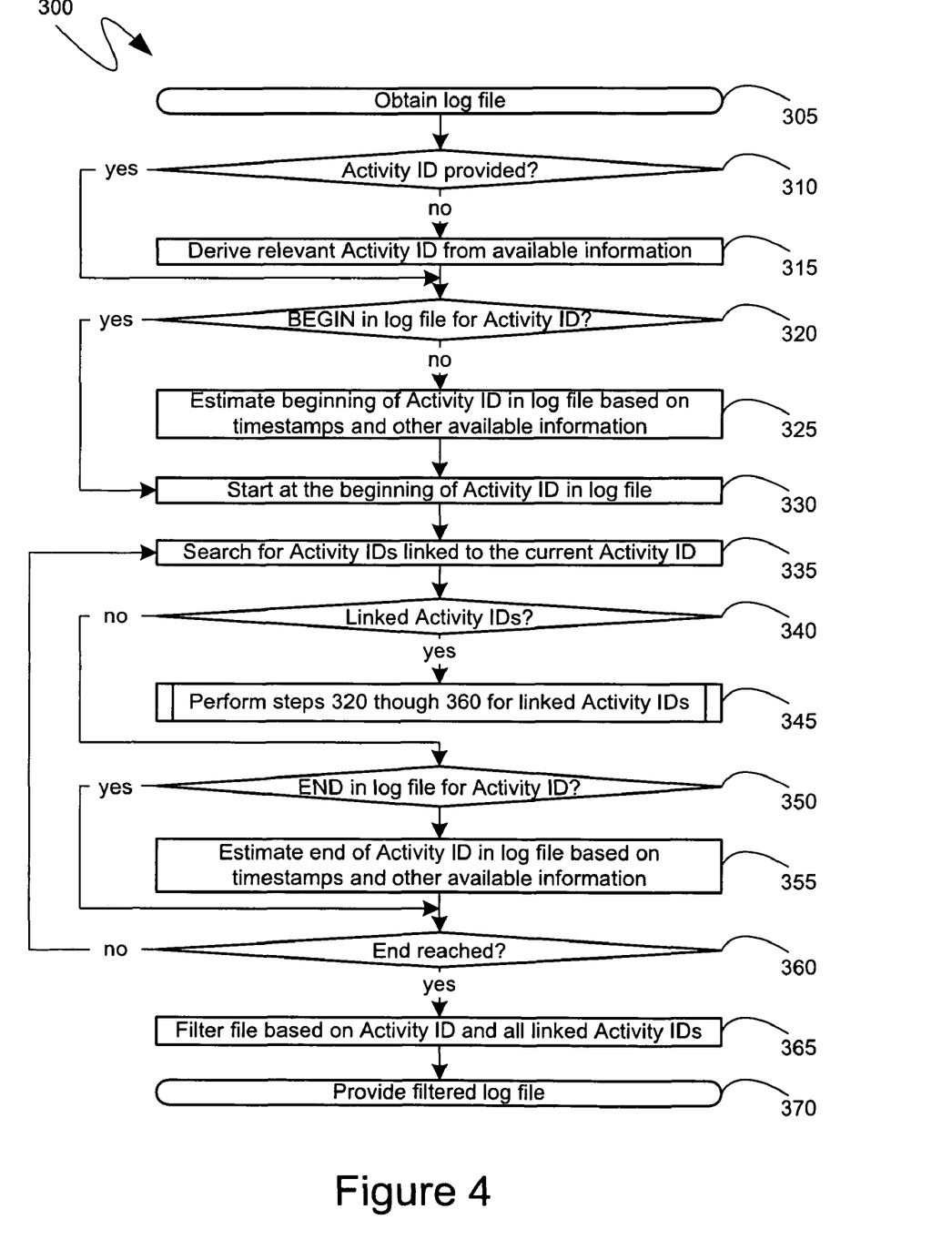
FIG. 4 is a flow diagram of an exemplary log file filtering mechanism utilizing activity identifiers.

Turning to FIG. 4, a flow diagram 300 is shown illustrating an exemplary series of steps by which the event store 10 can be filtered by the event correlation component 30, based, at least in part, on the activity identifiers stored in the event store, to provide, to the analysis tools 40, a series of correlated events and information, all of which are relevant to, or otherwise associated with, the activity that caused the error that is being investigated. Initially, as illustrated by step 305, the event correlation component 30 can obtain the log file from the event store 10. Subsequently, at step 310, a determination can be made whether an activity identifier was provided for the activity that caused the error being investigated. In one embodiment, error detection mechanisms can provide the activity identifier of the activity that caused the error to the event correlation component 30. Thus, for example, if the web browser application 61 experienced an error in opening a web page, an error detection mechanism could present a notification to a user, providing the user with the option of diagnosing the error. Should the user select to do so, logging can be activated and the process described in detail above can be performed while reproducing the error. Subsequently, the error detection mechanism can obtain the activity identifier selected by the web browser application 61, previously nominated "A", and provide that identifier to the event correlation component 30 to enable it to filter the event store 10. In an alternative embodiment, the error detection mechanism can set its own activity identifier and then initiate a reproduction of the error in the manner previously described. In such an embodiment, rather than providing the event correlation component 30 with the activity identifier selected by the web browsing application, the error detection mechanism can provide its own activity identifier.

If, at step 310, it is determined that a relevant activity identifier was provided, then the processing of the event correlation component 30 can proceed with step 320. However, if a relevant activity identifier was not provided at step 310, then, at step 315, the event correlation component 30 can derive the relevant activity identifier from other available information. For example, other identifying information about the error, such as, for example, the network address from which the web page was requested, can be utilized by the event correlation component 30 to identify the proper activity identifier by searching the event store 10 for activity identifiers associated with operations that utilized, or specified, that particular network address.

Once the relevant activity identifier has been obtained by the event correlation component 30, the event correlation component can proceed to identify the entries in the event store 10 that correspond to, or are otherwise associated with, the error-causing activity. In one embodiment, such a filtering of the entries in the event store 10 can comprise an identification of some or all of the activity identifiers that identify aspects of the same activity; in particular activity identifiers that are either implicitly or explicitly linked to one another, such as in the manner described above. Consequently, at step 320, the event correlation component 30 can proceed to search for an explicit indication of the beginning of the use of the relevant activity identifier as an identifier for the error-causing activity since, as indicated previously, identical identifiers can be used to identify multiple activities during different time periods.

If, at step 320, an explicit indication of the beginning of the lifetime of an activity identifier is found, then processing can proceed with step 330. If, however, no such explicit indication is found, then, at step 325, the event correlation component 30 can estimate the beginning of the use of the activity identifier as an identifier for the relevant activity from other available information, including the timestamps of the entries in the event store 10. For example, the event correlation component 30 can identify an event in the event log 10 that specifies the relevant activity identifier, and can then search entries that have earlier timestamps to determine if there are any earlier entries that are associated with the same activity identifier. If the event correlation component 30 does not identify any such earlier entries, it can, in one embodiment, assume that it has identified the earliest entry associated with the relevant activity identifier and can assume that the beginning of the lifetime of that activity identifier was approximately prior to the identified entry.

Once the event correlation component 30 has identified the beginning of the lifetime of the activity identifier, it can start at that point, as indicated by step 330, and can proceed to search for activity identifiers that are linked to that activity identifier at step 335. If, at step 340, the event correlation component 30 does not identify any activity identifiers that are linked to the provided activity identifier, it can proceed to filter the event store 10 in the manner described below. However, if, at step 340, the event correlation component 30 does identify at least one other activity identifier that is linked to the current activity identifier, it can, as indicated by step 345, repeat steps 320 through 360 for that linked activity identifier. More specifically, the event correlation component 30 can recursively process each activity identifier that is linked to the activity identifier initially provided or obtained at steps 310 and 315, respectively, thereby building a "graph" of interrelated and linked activity identifiers.

In one embodiment, the event correlation component 30 can identify activity identifiers as being linked to the current activity identifier, at step 335, even if there is no explicit linking indication provided in the event store 10. For example, returning to the above example of the web page request, if a firewall had blocked transmission of the request packets 235, such information would have been provided to the networking device interface 58, but it may not have been provided to the protocol component 56 and, consequently, no explicit relationship may have been provided to the event store 10 linking the activity identifiers "X1", "X2", and so on, with the activity identifier "T". The event correlation component 30 can, nevertheless, identify the activity identifiers "X1", "X2", and so as being linked to the activity identifier "T" at step 340 based on other available information, such as, for example, the network address information associated with the returned packets.

For each activity identifier that the event correlation component 30 determines is to be included within the graph of related activity identifiers that will be used to filter the events of the event store 10, the event correlation component can examine the events in the event store from the beginning of the lifetime of that activity identifier until the end of the lifetime of that activity identifier. Consequently, at step 350, after searching for other linked activity identifiers, the event correlation component 30 can search for an explicit indication, in the event store 10, that the lifetime of the activity identifier has ended. If such an explicit indication is found, processing can proceed with step 360. However, if no such explicit indication was provided to the event store 10, the event correlation component 30 can, in an analogous manner to that described above with respect to step 325, estimate the end of the lifetime of the activity identifier based on other available information, including, for example, information, such as an indication of the beginning of an activity identifier lifetime indicating that the same activity identifier is, from that period in time, being utilized to identify an unrelated activity.

Once the event correlation component 30 has identified the end of lifetime of the activity identifier it was investigating, it can determine, at step 360, if there are any further activity identifiers for which it should cycle through the event store 10. If such activity identifiers exist, processing can return to step 335. Alternatively, if the graph of the related activity identifiers, each identifying some aspect of the same activity, is complete, the event correlation component 30 can proceed, at step 365, to filter the events in the event store 10 based on the linked activity identifiers. In one embodiment, the filtering performed at step 365 can remove any events from the event store 10 that are not identified, or otherwise associated with, the activity identifiers of the relationship graph built by the event correlation component 30. In an alternative embodiment, the filtering preformed at step 365 can remove only those events that are associated with activity identifiers other than those in the relationship graph. Lastly, at step 370, the filtered log file, comprising only those events from the event store 10 that were not removed by step 365, can be provided to the analysis tools 40 for analysis of the error and, potentially, for an identification of the reason for the error, or for other information that can aid in the future mitigation of the error.

As can be seen from the above descriptions, mechanisms for generating, linking and using activity identifiers to identify actions across applications and components that are all related to a common activity have been provided. In view of the many possible variations of the subject matter described herein, we claim as our invention all such embodiments as may come within the scope of the following claims and equivalents thereto.

We claim:

1. One or more computer-readable storage media comprising computer-executable instructions for filtering an event store to remove entries unrelated to an activity that is being analyzed, the computer-executable instructions directed to steps comprising:
    identifying a first activity identifier associated with the activity and utilized by a first component participating in the activity, wherein the identifying the first activity identifier comprises receiving a first activity identifier from an error analysis component invoked to analyze the activity, and wherein further the first activity identifier was set by the error analysis component;
    identifying a second activity identifier associated with the activity and utilized by a second component participating in the activity;
    building a graph linking the first activity identifier and the second activity identifier; and
    filtering the event store to remove entries associated with activity identifiers that are not in the graph.

2. The computer-readable storage media of claim 1, wherein the computer-executable instructions directed to the identifying the second activity identifier comprise computer-executable instructions directed to searching the event store for an explicit indication linking the first activity identifier to the second activity identifier.

3. The computer-readable storage media of claim 1, wherein the computer-executable instructions directed to the identifying the second activity identifier comprise computer-executable instructions directed to deriving the second activity identifier by locating, in the event store, information known to be associated with the activity, and obtaining the second identifier from the located information.

4. The computer-readable storage media of claim 1, wherein the computer-executable instructions directed to the identifying the second activity identifier comprise computer-executable instructions directed to deriving the second activity identifier based on a temporal connection between at least one first action referenced in the event store and associated with the first activity identifier and at least one second action referenced in the event store and associated with the second activity, the temporal connection being established by reference to timestamps of the at least one first action and the at least one second action.

5. One or more computer-readable storage media comprising computer-executable instructions for logging information in an event store, the computer-executable instructions directed to steps comprising:
    deriving an activity identifier, that identifies an activity, for a current action that is associated with the activity;
    providing, to the event store, current action information associated with the current action, the current action information comprising the derived activity identifier;
    obtaining another activity identifier that also identifies the activity, the obtained other activity identifier being derived for another action associated with the activity, the other action being performed by another component; and
    providing linking information to the event store linking the derived activity identifier with the obtained other activity identifier.

6. The computer-readable storage media of claim 5 comprising further computer-executable instructions for providing, to the event store, a beginning indication of the current lifetime of the derived activity identifier, wherein the derived activity identifier is used to identify only the activity during the current lifetime.

7. The computer-readable storage media of claim 5 comprising further computer-executable instructions for providing, to the event store, an ending indication of a current lifetime of the derived activity identifier, wherein the derived activity identifier is used to identify only the activity during the current lifetime.

8. The computer-readable storage media of claim 7 comprising further computer-executable instructions for deriving the activity identifier for a subsequent action that is associated with another activity, the activity identifier now identifying the other activity, after the ending indication was provided to the event store.

9. The computer-readable storage media of claim 5 comprising further computer-executable instructions for receiving, from the other component, a request that references information associated with the activity and that requests the performance of the current action.

10. The computer-readable storage media of claim 9, wherein the computer-executable instructions directed to deriving the activity identifier comprise computer-executable instructions directed to deriving the activity identifier based on the request-referenced information associated with the activity.

11. The computer-readable storage media of claim 5 comprising further computer-executable instructions for directing a request, to the other component, for the performance of the other action, the request referencing information associated with the activity.

12. A method of tracing an activity across multiple components comprising the steps of:
    deriving, at a first component, a first activity identifier that identifies the activity and that is associated with a first action performed by the first component, the activity comprising the first action;
    providing, to an event store, first action information associated with the first action, the first action information comprising the first activity identifier;
    providing, to the event store from the first component, an ending indication of a current lifetime of the first activity identifier, wherein the first activity identifier is used by the first component to identify only the activity during the current lifetime;
    deriving, at the first component, the first activity identifier for a subsequent action performed by the first component that is associated with another activity, the first activity identifier now identifying the other activity, after the ending indication was provided to the event store;

deriving, at a second component, a second activity identifier that identifies the activity and that is associated with a second action performed by the second component, the activity comprising the second action;

obtaining, at the second component, the first activity identifier;

providing, to the event store, linking information linking the first activity identifier and the second activity identifier;

obtaining, at an event correlation component, a specification of the first activity identifier;

building, at the event correlation component, a graph linking the first activity identifier and the second activity identifier based on the provided linking information; and filtering the event store to remove entries associated with activity identifiers that are not in the graph.

13. The method of claim 12 further comprising the steps of: locating, in the event store, by the event correlation component, information known to be associated with the activity; obtaining, at the event correlation component, a third activity identifier from the located information; and modifying, at the event correlation component, the graph linking the first activity identifier and the second activity identifier to further link the first activity identifier and the second activity identifier to the third activity identifier.

14. The method of claim 12 further comprising the steps of: locating, in the event store, by the event correlation component, a third activity identifier; identifying, by the event correlation component, the third activity identifier as being linked to the first activity identifier and the second activity identifier based on a temporal connection between at least one first action referenced in the event store and associated with either the first activity identifier or the second activity identifier and at least one second action referenced in the event store and associated with the third activity, the temporal connection being established by reference to timestamps of the at least one first action and the at least one second action; and modifying, at the event correlation component, the graph linking the first activity identifier and the second activity identifier to further link the first activity identifier and the second activity identifier to the third activity identifier.

15. The method of claim 12 further comprising the steps of providing, to the event store from the first component, a beginning indication of the current lifetime of the first activity identifier, wherein the first activity identifier is used by the first component to identify only the activity during the current lifetime.

* * * * *